United States Patent [19]
Perlman et al.

[11] Patent Number: 5,351,295
[45] Date of Patent: Sep. 27, 1994

[54] SECURE METHOD OF NEIGHBOR DISCOVERY OVER A MULTIACCESS MEDIUM

[75] Inventors: Radia J. Perlman, Acton; Charles W. Kaufman, Northborough, both of Mass.

[73] Assignee: Digital Equipment Corporation, Maynard, Mass.

[21] Appl. No.: 86,596

[22] Filed: Jul. 1, 1993

[51] Int. Cl.⁵ .......................... H04L 9/32; H04L 9/00
[52] U.S. Cl. ........................................ 380/23; 380/25; 380/29; 380/49; 380/50; 340/825.31; 340/825.34
[58] Field of Search ...................... 380/3, 4, 23, 24, 25, 380/49, 50, 29; 340/825.31, 825.34

[56] References Cited

U.S. PATENT DOCUMENTS

| | | | |
|---|---|---|---|
| 3,798,605 | 3/1974 | Feistel | 380/25 |
| 4,218,738 | 8/1980 | Matyas et al. | 380/25 |
| 4,227,253 | 10/1980 | Ehrsam et al. | 380/45 |
| 4,430,728 | 2/1984 | Beitel et al. | 340/825.31 X |
| 4,626,845 | 12/1986 | Ley | 380/23 X |
| 4,661,991 | 4/1987 | Logemann | 340/825.31 X |
| 4,815,031 | 3/1989 | Furukawa | 380/23 X |
| 4,910,773 | 3/1990 | Hazard et al. | 380/21 |
| 5,050,212 | 9/1991 | Dyson | 380/25 |
| 5,081,678 | 1/1992 | Kaufman et al. | 380/21 |
| 5,136,646 | 8/1992 | Haber et al. | 380/49 |
| 5,136,647 | 8/1992 | Haber et al. | 380/49 |
| 5,146,499 | 9/1992 | Geffrotin | 380/23 |
| 5,148,479 | 9/1992 | Bird et al. | 380/23 |
| 5,163,096 | 11/1992 | Clark et al. | 380/4 |

*Primary Examiner*—Bernarr E. Gregory
*Attorney, Agent, or Firm*—Denis G. Maloney; Albert P. Cefalo

[57] ABSTRACT

A secure arrangement in which stations in a communications network are informed of the addresses of their neighbors by means of identifying messages transmitted by the stations. To prevent the insertion of illegitimate stations into the network, the system makes use of passwords included in the station-identifying messages. In networks where eavesdropping is possible, the passwords are encrypted versions of the identities of the stations transmitting the messages and in systems where stations can also be impersonated, the encrypted passwords also include time stamps.

6 Claims, 2 Drawing Sheets

SECURE METHOD OF NEIGHBOR DISCOVERY OVER A MULTIACCESS MEDIUM

FIELD OF THE INVENTION

This invention relates to the finding of neighbors across a multi-access communications medium with a minimum of preloaded configuration information. It relates more particularly to a secure arrangement for auto-configuration of network stations with the addresses of their neighbors.

BACKGROUND OF THE INVENTION

In a communications network it is usually desirable that stations, or nodes, in the network "know" the addresses of their neighbors, i.e. the other stations with which they can communicate directly. It is particularly important that routers contain this information, so that they can efficiently direct messages along paths leading to the message destinations. Each station can be configured manually with the addresses of other stations with which it directly communicates. However this does not provide for the efficient configuration of stations having large numbers, for example, hundreds of neighbors. Nor does it provide for the efficient inclusion of additional stations or the removal of stations from the system.

In a network or subnetwork that employs a broadcast transmission medium, each station can use a multicast message to identify itself to all of its neighbors. With this arrangement each station can maintain an accurate list of all of its neighbors.

However, a corresponding arrangement on a non-broadcast medium would require an unduly large number of station-identifying messages. Accordingly a different system has been proposed for such media.

One station is selected as a designated station, e.g. on the basis of a priority, such as high or low identification number as compared with the identification of its neighbors. All the other stations periodically send to the designated station Is-Hello messages identifying themselves to the designated station. The designated station maintains an address list of all of the neighboring stations and periodically communicates this list to each of them in Dn-Hello messages.

Each station is initially configured with a list containing the address of at least one other station in its neighborhood. At system startup, or if a designated station goes out of service, each other station initially assumes that it is the designated station and it sends Dn-Hello messages to each of the stations on its list. It also receives Hello messages from other stations. If it receives a Hello message from a station having a hiker priority than the station it currently "believes" is the designated station (which may be itself), it assumes that the sender is the designated station, it ceases sending Dn-Hello messages and begins to send Is-Hello messages to the latter station.

If a station receives a message from a second station, but believes that a third station is the designated station, it sends a Hello-Redirect message to the second station, advising the latter that the third station is the designated station. This protocol will ultimately result in the selection of a single designated station.

When a station is installed in the network, the foregoing protocol will ultimately result in an identification of the designated station to the new station and the inclusion of the new station on the list that is communicated to the other stations by the designated station.

In the present application we use the term Hello to refer collectively to the three types of messages described above.

Moreover, since the protocols involved herein relate to multi-access links, we refer to addresses on the multi-access links as "data link" addresses.

While the systems discussed above provide efficient mechanisms for the incorporation of additional stations into a network, they are subject to compromise by an intruder who manages to connect an alien station into the network. The alien station will be recognized as a legitimate neighboring station and will thus provide unauthorized access to the network. Indeed, in a system employing the Hello message protocol, an eavesdropper who knows the selection criterion for a designated station can, in some networks, provide an alien station with an address that causes it to become the designated station. The intruder can then wreak havoc by removing legitimate stations from the address list and/or adding other alien stations.

The principal object of the invention is therefore to prevent the insertion of unauthorized stations into a network. Specifically, it is an object of the invention to provide a system in which only legitimate stations incorporated into the system will be recognized for communications from and to neighboring stations.

SUMMARY OF THE INVENTION

The invention makes use of a password in the messages in which stations identify themselves or other stations to neighboring stations. In a network that is not subject to eavesdropping and in which a station cannot impersonate another station, i.e. use a false physical layer address, the same password can be used by all of the stations in a neighborhood and can be sent in the clear.

On the other hand, if the medium is subject to eavesdropping, the password must be specific to each station. To avoid per-neighbor configuration, we derive a station specific password through encryption with a single secret shared by all legitimate stations on the link. We use an encryption key that is a shared secret among the authorized stations in the neighborhood, with the sender of a station-identifying message using the key to encrypt its own data link address.

If the system employs a medium in which one can impersonate another station by using its data link address, an eavesdropper could impersonate a legitimate station merely by replaying the latter station's password and using its address. Accordingly, in that case we prefer to encrypt a sequence number, such as a time stamp, along with the sender's address. This will prevent a replay attack, since the time stamp in the encrypted password will not match the time of receipt of the bogus message.

The station-identifying information can be encrypted with an algorithm such as the Data Encryption Standard and then decrypted at the receiving end to recover the encrypted information. Alternatively, one might use a signature arrangement. Yet another password arrangement involves the application of a one-way hash function to the concatenation of the secret key with the sender's address to generate the password. At the receiving end the same function is applied to the concatenation of the secret key with the received identification, the message being authenticated by a match of the result with the transmitted password.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

We shall describe the application of the invention to systems which use the Hello message protocol described above and are subject to eavesdropping. Use of the invention in connection with other station-identifying arrangements will be obvious.

Figure 1:
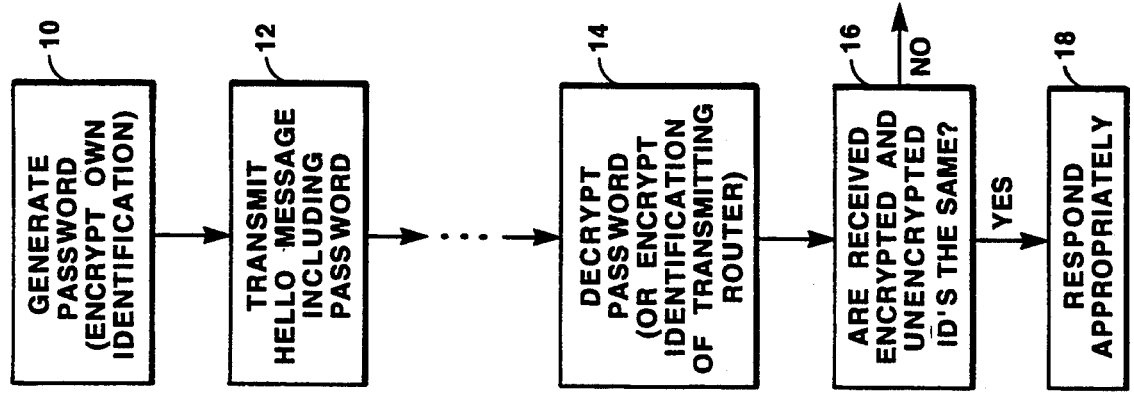
FIG. 1 is a flow diagram of the operation of a first embodiment of the invention.

FIG. 1 illustrates the application of the invention, in a relatively simple form, to a communication medium in which a station cannot impersonate another station, i.e. cannot direct messages to itself by using the identification of another station. In that case all that is required is that each station transmitting a Hello message generate a password unique to that station. Preferably, the password is the encrypted form of an identification of the station, e.g. its data link layer address. The encryption may be performed in accordance with the Data Encryption Standard (See "Data Encryption Standard", Federal Information Processing Standards Publication No. 46, January 1977; "DES Modes of Operation", Federal Information Processing Standards Publication No. 81, December 1980). The encryption key is resident only in the stations in the same neighborhood. Accordingly, as indicated in the box 10 of FIG. 1, a station that is to transmit a Hello message generates, as a password, the encrypted form of its data link address.

As indicated in box 12 the station then transmits the Hello message, including as part of the message the password generated as in box 10.

The station to which the message was directed decrypts the password as indicated in box 14 and then compares the encrypted password with the sender's unencrypted identification transmitted with the message. In the present example this is the sender's address contained in the data link header. If the two versions of the password are the same, the station responds appropriately as indicated in box 18. Thus if the message is a Dn-Hello message, it brings its internal station list into conformance with the list contained in the message. If the incoming message is an Is-Hello message, it adds the message to its station list if it "believes" it is the designated station. If it "knows" it is not the designated station, it replies with a Hello Redirect message identifying the station it believes to be the designated station.

It may be more efficient for the receiving station to encrypt the sender's address contained in the data link header and compare the result with the received password. In either case, the encrypted identity is compared with a non-encrypted identity supplied by the sender of the message.

Figure 2:
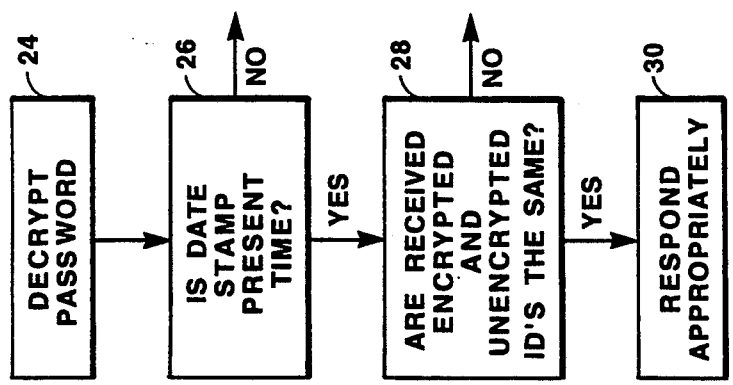
FIG. 2 is a flow diagram of the operation of a second embodiment of the invention.

In FIG. 2 we have illustrated the application of the invention to a network in which a station can be configured to impersonate another station by using the latter station's identification in communicating with other nodes on the network. To prevent impersonation in the use of the various Hello messages, we use a password that is unique to the transmitting station and is also time variant so that it continually changes. Specifically, as shown in box 20, a station that is to transmit a Hello message generates a password by encrypting a concatenation of its identification and a time stamp that indicates the time interval during which the message is being transmitted. As indicated in box 22, the password is included in the Hello message which is transmitted by the station.

As indicated in the box 24, the station to which the Hello message is addressed decrypts the password. As indicated at box 26, it checks the time stamp. If the decrypted time stamp is acceptably close to the present time, the station proceeds to compare the decrypted identification with the identification of the transmitting station included in the data link header, as indicated in box 28. If the two identifications match, the receiving station then takes the appropriate response as indicated at 30.

In the arrangement depicted in FIG. 2, there is a specified minimal interval between Hello messages transmitted by a station to the same recipient station. If a station receives two Hello messages from the same station within the specified interval it discards the second message, thereby preventing replay attacks.

Figure 3:
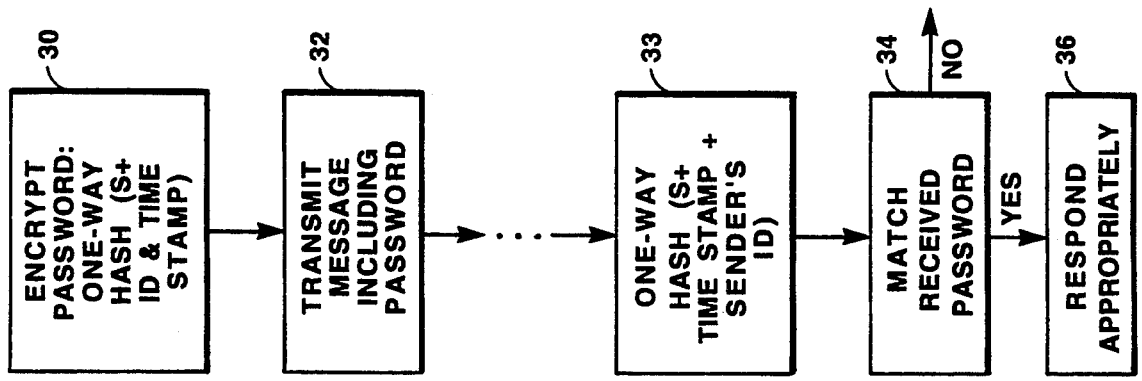
FIG. 3 depicts a third embodiment of the invention.

In FIG. 3 we have illustrated a password system that requires less transmission overhead than the systems depicted in FIGS. 1 and 2. This arrangement makes use of a random number S which is a shared secret among the legitimate stations in the neighborhood. As indicated in the box 30, the password is generated by applying a cryptographic function, such as a one-way hash function, to a combination, e.g. concatenation, of S, the identification of the transmitting station and a time stamp. Again the password is transmitted as part of the Hello message. At the receiving end, the same cryptographic function is also applied, this time to the concatenation of S, the present time and the identification of the transmitting station as contained in the data link header. The result is compared with the transmitted password as indicated in the box 34 and if the two numbers are the same indicating that the Hello message has been received from a legitimate station, the recipient station engages in the appropriate response as indicated in box 36.

Figure 4:
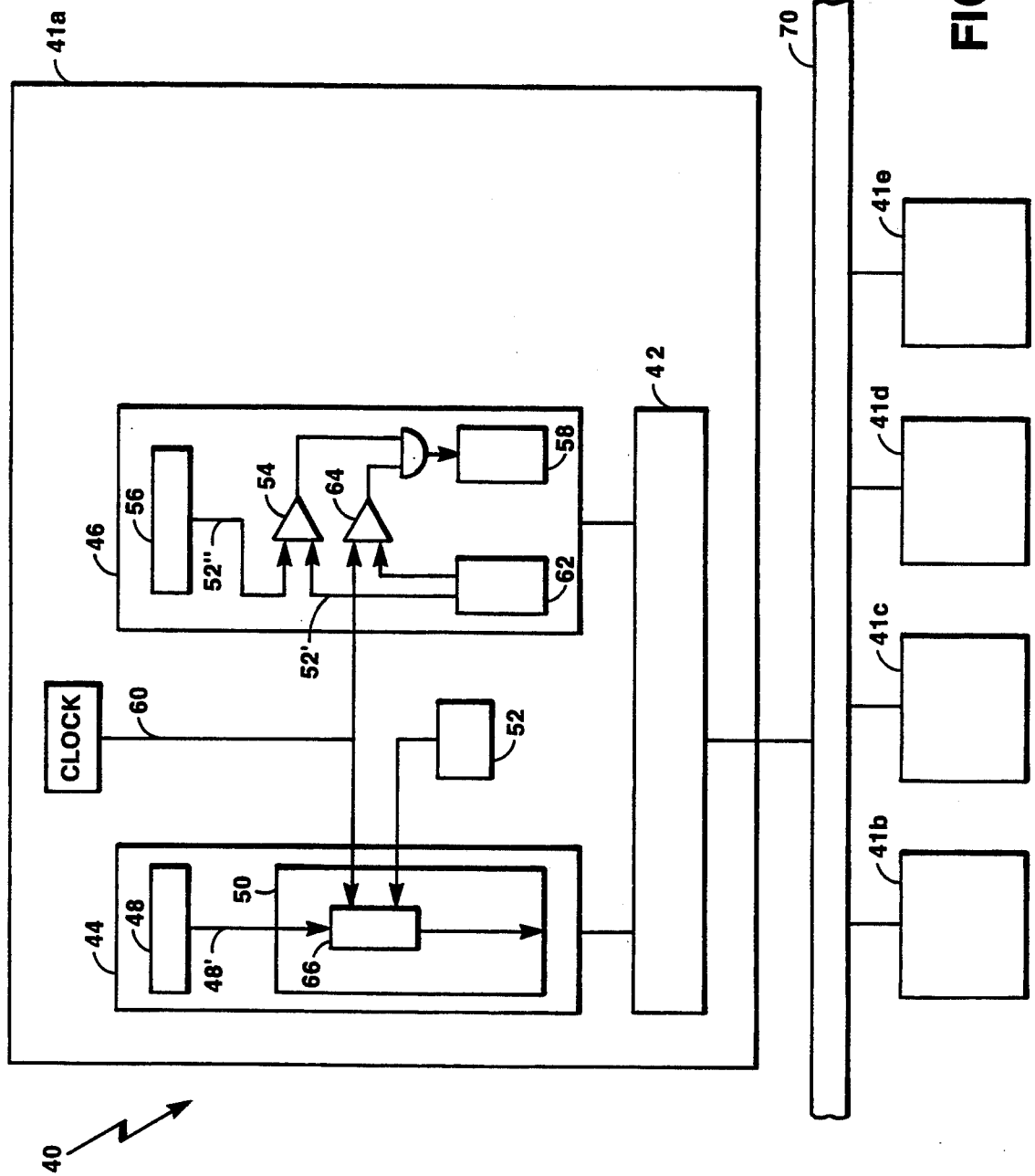
FIG. 4 is a block diagram depicting an apparatus for communicating addresses of neighbor stations to a station within a communication network.

Referring now to FIG. 4, an apparatus 40 which communicates to a station 41a in a communication network 70 addresses of other stations 41b–41e within the communication network 70 that the station 41a is capable of communicating with directly is shown. The other stations 41b–41e, which can communicate directly with station 41a, are referred to as neighbors of the station 41a. As shown, the apparatus 40 includes an apparatus to implement a message protocol 42 to exchange identifying messages between the station 41a and the neighbors of the station 41b–41e thus identifying the neighbors 41b–41e to the station 41a. The apparatus 40 also includes an apparatus to include a password 44 with each of the identifying messages and, an apparatus to restrict communications 46 between the station 41a and the neighbors of the station 41b–41e to those neighbors of the station 41b–41e identified to the station 41a through identifying messages which contain the password. Each station 41a–41e within the communication network 70 includes storage for a common secret number 48, and an apparatus to form the password 50 by using the secret number 48' to encrypt an identification of the station 52.

FIG. 4 also shows each station 41a–41e which receives one of the identifying messages includes an apparatus 54 to compare the identification of a transmitting station as encrypted in the password 52' included with each identifying message to a non-encrypted identification of the transmitting station 52", and an apparatus to respond to the identifying message 58 only if the identification of the transmitting station as encrypted 52' corresponds with the non-encrypted identification of the transmitting station 52". The apparatus to form the password 50 may also include an apparatus responsive to the secret number 66 to encrypt a combination of a time stamp 60 and the identification of the station 52.

In FIG. 4, each station receiving one of the identifying messages also includes an apparatus to decrypt the password 62, an apparatus to make a first comparison of the encrypted time stamp with a time of receipt of the identifying message 64 and an apparatus to make a second comparison of a transmitting station identification in the password with a received unencrypted identification of the transmitting station 54, and an apparatus to respond to the identifying message 58 only if both comparisons are positive.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An apparatus for communicating to a station in a communication network addresses of other stations within said communication network which said station is capable of communicating with directly, said other stations being referred to as neighbors of said station, said apparatus comprising:

means for implementing a message protocol for exchanging identifying messages between said station and said neighbors of said station to identify said neighbors to said station;

means for including a password with each of said identifying messages; and means for restricting communications between said station and said neighbors of said station to those of said neighbors of said station identified to said station through identifying messages containing said password.

2. The apparatus of claim 1 in which each station within said communication network includes:

means for storing a common secret number; and means for forming said password by using the secret number to encrypt an identification of the station.

3. The apparatus of claim 2 in which the identification of the station is an address of the station as contained in a frame header.

4. The apparatus of claim 3 wherein said means for forming the password includes:

means responsive to the secret number for encrypting a combination of a time stamp and the identification of the station.

5. The apparatus of claim 4 in which each station receiving one of said identifying messages includes:

means for decrypting the password;

means for making a first comparison of the encrypted time stamp with a time of receipt of the identifying message and making a second comparison of a transmitting station identification in the password with a received unencrypted identification of the transmitting station; and means for responding to the identifying message only if both comparisons are positive.

6. The apparatus of claim 2 in which each station receiving one of said identifying messages includes:

means for comparing the identification of a transmitting station as encrypted in the password included with each identifying message to a non-encrypted identification of the transmitting station; and means for responding to the identifying message only if the identification of the transmitting station as encrypted corresponds with the non-encrypted identification of the transmitting station.

* * * * *